US011229083B1

(12) United States Patent
Panchal

(10) Patent No.: US 11,229,083 B1
(45) Date of Patent: Jan. 18, 2022

(54) SYSTEMS AND METHODS FOR USER EQUIPMENT-INITIATED CONNECTION RELEASE

(71) Applicant: Verizon Patent and Licensing Inc., Basking Ridge, NJ (US)

(72) Inventor: Jignesh S. Panchal, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 41 days.

(21) Appl. No.: 17/011,332

(22) Filed: Sep. 3, 2020

(51) Int. Cl.
*H04W 76/30* (2018.01)
*H04W 24/10* (2009.01)

(52) U.S. Cl.
CPC ........... *H04W 76/30* (2018.02); *H04W 24/10* (2013.01)

(58) Field of Classification Search
CPC ..... H04W 36/08; H04W 76/27; H04W 24/10; H04W 36/30; H04W 36/0055; H04W 36/0033; H04W 36/14; H04W 36/0058; H04W 36/32; H04W 36/38; H04W 88/08; H04W 36/0022; H04W 36/0016; H04W 36/0061; H04W 36/0072; H04W 36/0088; H04W 74/0833; H04W 76/30; H04W 36/00; H04W 36/0066; H04W 36/0083; H04W 36/36; H04W 92/20; H04W 36/24; H04W 76/19; H04W 36/0069; H04W 36/0077; H04W 36/0085; H04W 72/042; H04W 92/02; H04W 36/0005; H04W 36/0079; H04W 36/00837; H04W 36/0094; H04W 36/18; H04W 88/02; H04W 24/02;
(Continued)

(56) References Cited

U.S. PATENT DOCUMENTS

2010/0067483 A1* 3/2010 Ahluwalia .......... H04W 36/023
370/331
2013/0183971 A1* 7/2013 Tamaki ............. H04W 36/0061
455/436
(Continued)

OTHER PUBLICATIONS

3GPP TS 38.300 V15.10.0 (Jul. 2020), "3rd Generation Partnership Project; Technical Specification Group Radio Access Network; NR; NR and NG-RAN Overall Description; Stage 2 (Release 15)," Jul. 2020 (available at https://www.3gpp.org/ftp/Specs/archive/38_series/38.300/38300-fa0.zip, accessed Jul. 24, 2020).
(Continued)

*Primary Examiner* — Yuwen Pan
*Assistant Examiner* — Jing Gao

(57) ABSTRACT

Embodiments described herein may provide for the return (e.g., reconnection) of a User Equipment ("UE") to a first radio access network ("RAN") to which the UE was connected, after the UE has been redirected to a second RAN based on the occurrence of an event. The event may include a voice call placed by or to the UE. The return of the UE to the first RAN may occur based on a request from the UE, such as a request made via Radio Resource Control ("RRC") messaging. The UE may make the request upon termination of the voice call. The first RAN may queue downlink data for the UE, received from a core network or some other source, based on receiving the request, in order to allow the UE to be instructed to connect to (e.g., be redirected to) the first RAN.

20 Claims, 10 Drawing Sheets

(58) Field of Classification Search
CPC ... H04W 36/165; H04W 36/22; H04W 48/18; H04W 48/20; H04W 52/0209; H04W 72/04; H04W 72/0453; H04W 76/34; H04W 28/08; H04W 36/34; H04W 36/385; H04W 52/40; H04W 72/1289; H04W 74/006; H04W 76/16; H04W 36/12; H04W 40/12; H04W 40/36; H04W 72/1226; H04W 72/1236; H04W 76/32
See application file for complete search history.

(56) References Cited

U.S. PATENT DOCUMENTS

| | | | | |
|---|---|---|---|---|
| 2015/0358477 | A1* | 12/2015 | Jeong | H04M 15/57 370/259 |
| 2017/0238362 | A1* | 8/2017 | Karandikar | H04W 88/16 370/328 |
| 2018/0152865 | A1* | 5/2018 | Atri | H04W 36/30 |
| 2019/0253944 | A1* | 8/2019 | Kim | H04W 36/0085 |
| 2019/0253945 | A1* | 8/2019 | Paladugu | H04W 76/27 |
| 2021/0007021 | A1* | 1/2021 | Adamou | H04W 36/34 |

OTHER PUBLICATIONS

3GPP TS 38.300 V16.2.0 (Jul. 2020), "3rd Generation Partnership Project; Technical Specification Group Radio Access Network; NR; NR and NG-RAN Overall Description; Stage 2 (Release 16)," Jul. 2020 (available at https://www.3gpp.org/ftp/Specs/archive/38_series/38.300/38300-g20.zip, accessed Jul. 24, 2020).

3GPP TS 38.331 V15.10.0 (Jul. 2020), "3rd Generation Partnership Project; Technical Specification Group Radio Access Network; NR; Radio Resource Control (RRC) protocol specification (Release 15)," Jul. 2020 (available at https://www.3gpp.org/ftp/Specs/archive/38_series/38.331/38331-fa0.zip, accessed Jul. 24, 2020).

3GPP TS 38.331 V16.1.0 (Jul. 2020), "3rd Generation Partnership Project; Technical Specification Group Radio Access Network; NR; Radio Resource Control (RRC) protocol specification (Release 16)," Jul. 2020 (available at https://www.3gpp.org/ftp/Specs/archive/38_series/38.331/38331-g10.zip, accessed Jul. 24, 2020).

* cited by examiner

US 11,229,083 B1

SYSTEMS AND METHODS FOR USER EQUIPMENT-INITIATED CONNECTION RELEASE

BACKGROUND

Wireless network providers may utilize radio access networks ("RANs") that implement different radio access technologies ("RATs"), such as Long-Term Evolution ("LTE") RATs, Fifth Generation ("5G") or New Radio ("NR") RATs, and/or other RATs. One example arrangement of RANs that may be implemented by a wireless network provider may include a Non-Standalone ("NSA") arrangement, in which portions of a 5G core ("5GC") may be correlated to portions of a LTE core (e.g., an Evolved Packet Core ("EPC")). Another example arrangement is a Standalone ("SA") arrangement, in which a 5G RAN may be communicatively coupled to a core network (e.g., a 5GC) without control signaling being handled by a LTE RAN. Some RANs (e.g., in a NSA arrangement or in a SA arrangement) may implement different 5G RATs, such as a "Sub-6 GHz" RAT and/or a millimeter-wave ("mmWave") RAT. In some wireless network configurations, a UE connected to a 5G RAN may be redirected to a RAN implementing a different RAT (e.g., a LTE RAN) in certain situations, such as when a voice call is placed by or received for the UE.

DETAILED DESCRIPTION OF THE PREFERRED EMBODIMENTS

The following detailed description refers to the accompanying drawings. The same reference numbers in different drawings may identify the same or similar elements.

Some wireless networks may cause UEs, connected to a 5G RAN, to connect to another type of RAN (e.g., a LTE RAN) in order to handle a voice call initiated by or placed to the UEs, but may not necessarily provide a mechanism for the UEs to reconnect to the 5G RAN upon termination of the voice call. For example, some systems provide the opportunity for the reconnection of a UE to the 5G RAN upon a mobility event (e.g., when the UE moves out of range of the LTE RAN to which the UE was redirected), when the UE enters an "idle" mode (e.g., in which no data is sent to or from the UE), and/or some other type of event or trigger. However, the occurrence of such events may have no particular relationship to the termination of a voice call, and the UE may therefore not receive service from the 5G RAN even if the UE is in range of the 5G RAN in the interim. Embodiments described herein may provide for the return (e.g., reconnection) of a UE to a 5G RAN after the UE has been redirected to another type of RAN (e.g., a LTE RAN) based on a voice call (or other type of event), where the return to the 5G RAN may be based on a request from the UE (e.g., upon the termination of the voice call).

Figure 1A:
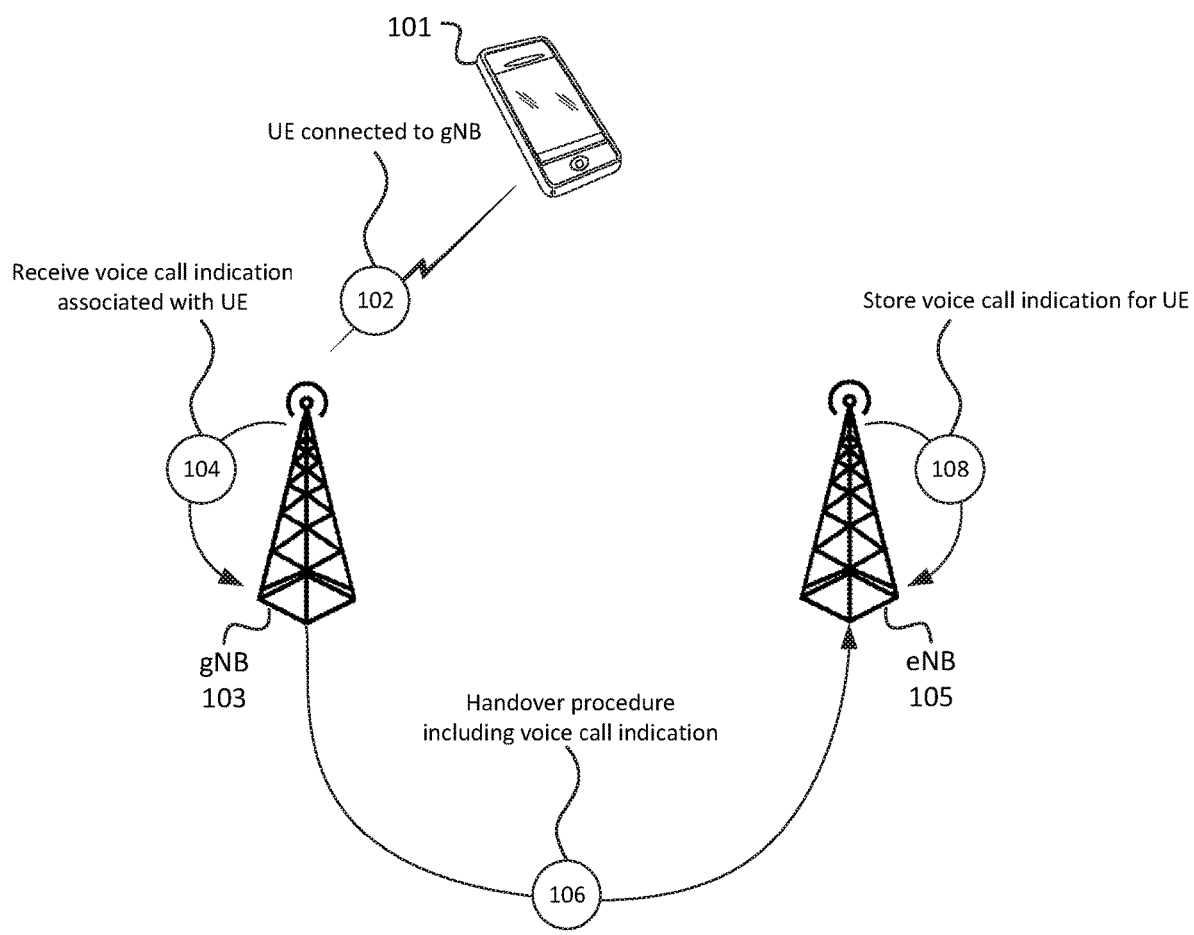
FIGS. 1A-1C illustrate an example overview of one or more embodiments described herein, in which a UE may be redirected from a 5G RAN to a LTE RAN for a voice call, and in which a fast return of the UE to the 5G RAN after the voice call has ended may be initiated by the UE.

As shown in FIG. 1A, for example, UE 101 may be connected (at 102) to Next Generation Node B ("gNB") 103, which may implement and/or may otherwise be associated with a 5G RAN. At some point, while UE 101 is connected to gNB 103, gNB 103 may receive (at 104) an indication of a voice call for UE 101. For example, gNB 103 may receive the indication from UE 101, and/or from one or more elements of a 5GC, such as an Access and Mobility Management Function ("AMF") to which gNB 103 is communicatively coupled. The voice call indication may, for example, be an indication that UE 101 has placed (e.g., initiated) a call, or that a call has been placed to UE 101. Based on receiving (at 104) the voice call indication, gNB 103 may initiate (at 106) a handover procedure, to cause UE 101 to connect to eNB 105 in lieu of to gNB 103. This type of procedure (e.g., handing over UE 101 to eNB 105 based on receiving a voice call indication) may sometimes be referred to as "LTE fallback," "Evolved Packet System ('EPS') fallback," or some other suitable terminology.

In accordance with some embodiments, gNB 103 may provide an indication during the handover procedure (at 106), to indicate that UE 101 was handed over to eNB 105 based on receiving a voice call. This indication may be provided as a "cause" in a handover request message sent by gNB 103. The handover procedure (at 106) may include a X2 handover procedure, in which gNB 103 communicates with eNB 105 via a X2 interface to hand UE 101 over to eNB 105 (e.g., a Handover Request message and/or one or more other suitable messages). In some embodiments, the handover procedure may include messages (e.g., Handover Required messages, Forward Relocation Request messages, and/or other suitable messages) sent to, from, and/or via one or more mobility and/or handover network elements associated with gNB 103 and/or eNB 105, such as an AMF associated with gNB 103 and/or a Mobility Management Entity ("MME") associated with eNB 105.

In some embodiments, eNB 105 may store (at 108) an indication that UE 101 was handed over to eNB 105 based on a voice call being placed by or to UE 101 (e.g., based on the cause indicated to eNB 105 during the handover procedure). As discussed below, this stored indication may be used by eNB 105 as a factor in determining that UE 101 should be handed back to gNB 103 (and/or to some other RAN or base station) when receiving an indication that the voice call has ended. In some embodiments, eNB 105 may forgo storing (at 108) such an indication.

Figure 1B:
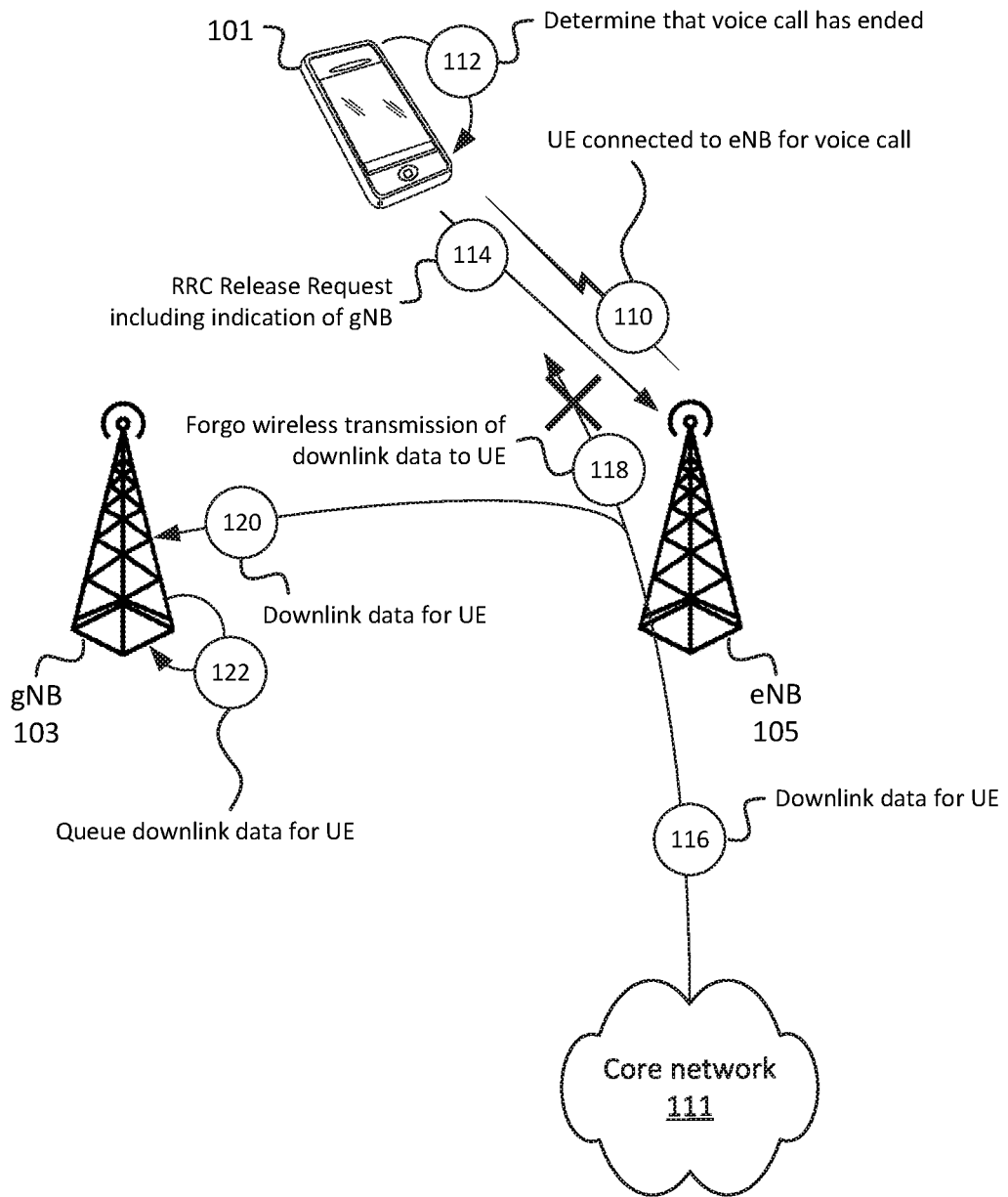

As shown in FIG. 1B, based on the handover (performed at 106), UE 101 may be connected (at 110) to eNB 105. Accordingly, UE 101 may participate in the voice call via eNB 105 (e.g., may send and/or receive voice call traffic and/or other traffic via eNB 105). At some point, UE 101 may determine (at 112) that the voice call has ended. For example, a user of UE 101 may have selected to end the voice call and/or the voice call may otherwise be disconnected or terminated.

Based on determining (at 112) that the voice call has ended, UE 101 may output (at 114) a request to release a connection of UE 101 to eNB 105. For example, in accordance with some embodiments, UE 101 may output one or more Radio Resource Control ("RRC") message requesting such release, such as a RRC Release Request message. The RRC Release Request message of some embodiments may include an indication of one or more base stations that are in range of UE 101. The indication of the one or more base stations may be based on radio frequency ("RF") measurement reports generated or obtained by UE 101, in which UE 101 may identify base stations in range of UE 101 as well as channel quality or other suitable metrics associated with such base stations. In the example described herein, the "target" base station identified by UE 101 (e.g., in the RRC Release Request) is the same gNB 103 from which UE 101 was initially handed over (at 106). In practice, the target base station may be another gNB and/or some other base station.

Based on receiving (at 114) the RRC Release Request message from UE 101, eNB 105 may forgo sending downlink data to UE 101. In some embodiments, in situations where eNB 105 has stored (at 108) an indication that UE 101 was handed over to eNB 105 based on a voice call, eNB 105 may further determine that downlink data should not be sent to UE 101 based on the stored indication. That is, in such embodiments, eNB 105 may determine that downlink data should be held (e.g., not sent to UE 101) only when an RRC Release Request has been received from UE 101 after (e.g., within a threshold amount of time of, such as ten minutes, one hour, or some other threshold amount of time) an indication has been received by eNB 105 that UE 101 has been handed over to eNB 105 for a voice call.

As shown, for example, eNB 105 may receive (at 116) downlink data for UE 101 from core network 111 (e.g., an EPC, and/or a hybrid core network that includes or implements elements of a 5GC and an EPC) after the voice call has ended. The downlink data may be for a different application or service other than the voice call, such as web browsing data, streaming content, augmented reality ("AR") content, and/or other types of data. The downlink data may be associated with an application or service that was in use prior to the voice call, and may benefit from or rely on communicating with gNB 103. For example, the downlink data may be associated with a high-bandwidth and/or low-latency application or service, for which 5G communications may enhance the user experience. In some scenarios, such services may be degraded or impractical to use in the absence of 5G communications. Thus, a fast return to a 5G RAN (e.g., to gNB 103) may enhance the user experience of a user of UE 101.

In accordance with some embodiments, and as noted above, eNB 105 may forgo (at 118) transmitting the downlink data to UE 101. In this manner, UE 101 may cease receiving downlink data via eNB 105, and may enter an "idle" mode and/or may otherwise determine that data is not being actively received from eNB 105. In scenarios where UE 101 is configured to forgo performing handovers while actively receiving data, the forgoing (at 118) of sending downlink data to UE 101 may allow UE 101 to subsequently connect to a different base station, such as gNB 103, as described below.

eNB 105 may further provide (at 120) some or all of the downlink data received (at 116) from core network 111 for UE 101 to gNB 103 via a X2 interface. For example, eNB 105 may use a cell identifier indicated in the RRC Release Request message to identify and communicate with gNB 103 via the X2 interface. eNB 105 may also provide (at 120) one or more identifiers of UE 101, such as a Globally Unique Temporary Identifier ("GUTI"), a Subscription Permanent Identifier ("SUPI"), an International Mobile Station Equipment Identity ("IMEI"), an International Mobile Subscriber Identity ("IMSI"), a Mobile Directory Number ("MDN"), an Internet Protocol ("IP") address, and/or some other suitable identifier. gNB 103 may queue (at 122) the received downlink data. gNB 103 may use the identifier of UE 101 to subsequently provide the queued downlink data to UE 101, as described below.

Figure 1C:
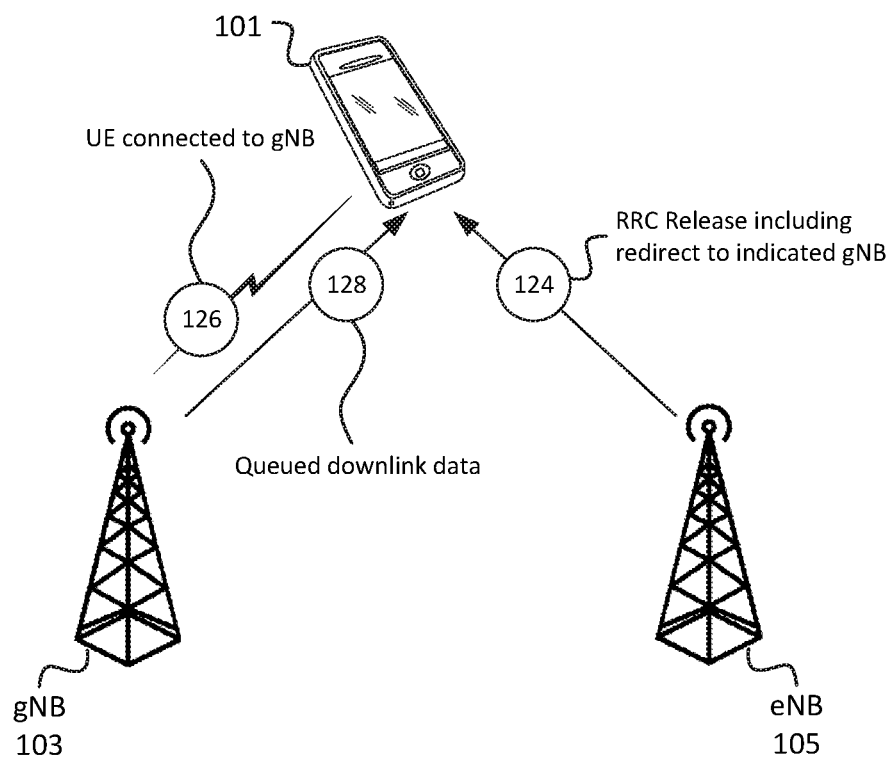

For example, as shown in FIG. 1C, based on receiving (at 114) the RRC Release Request message from UE 101, eNB 105 may output (at 124) a RRC Release message in accordance with some embodiments. The RRC Release message may include a redirection or other indication that UE 101 should connect to a given base station or RAN. For example, in this example, the redirection may indicate that UE 101 should connect to gNB 103, as indicated by UE 101 in the RRC Release Request message (sent at 114). As UE 101 is not currently receiving downlink data from eNB 105, UE 101 may immediately connect (at 126) to gNB 103, as instructed in the RRC Release message. As noted above, this immediate connection to gNB 103 is in contrast with situations in which UE 101 is continuing to receive downlink data from eNB 105, and in which UE 101 may accordingly be configured to wait until no longer actively receiving downlink data before performing a redirection, handover, or cell reselection procedure. Once UE 101 is connected to gNB 103, gNB 103 may accordingly provide (at 128) the queued downlink data, as well as any new incoming downlink data received from core network 111 or some other source. In this manner, UE 101 may continue to receive 5G service from gNB 103 with minimal interruption after being redirected to eNB 105 for a voice call.

Figure 2A:
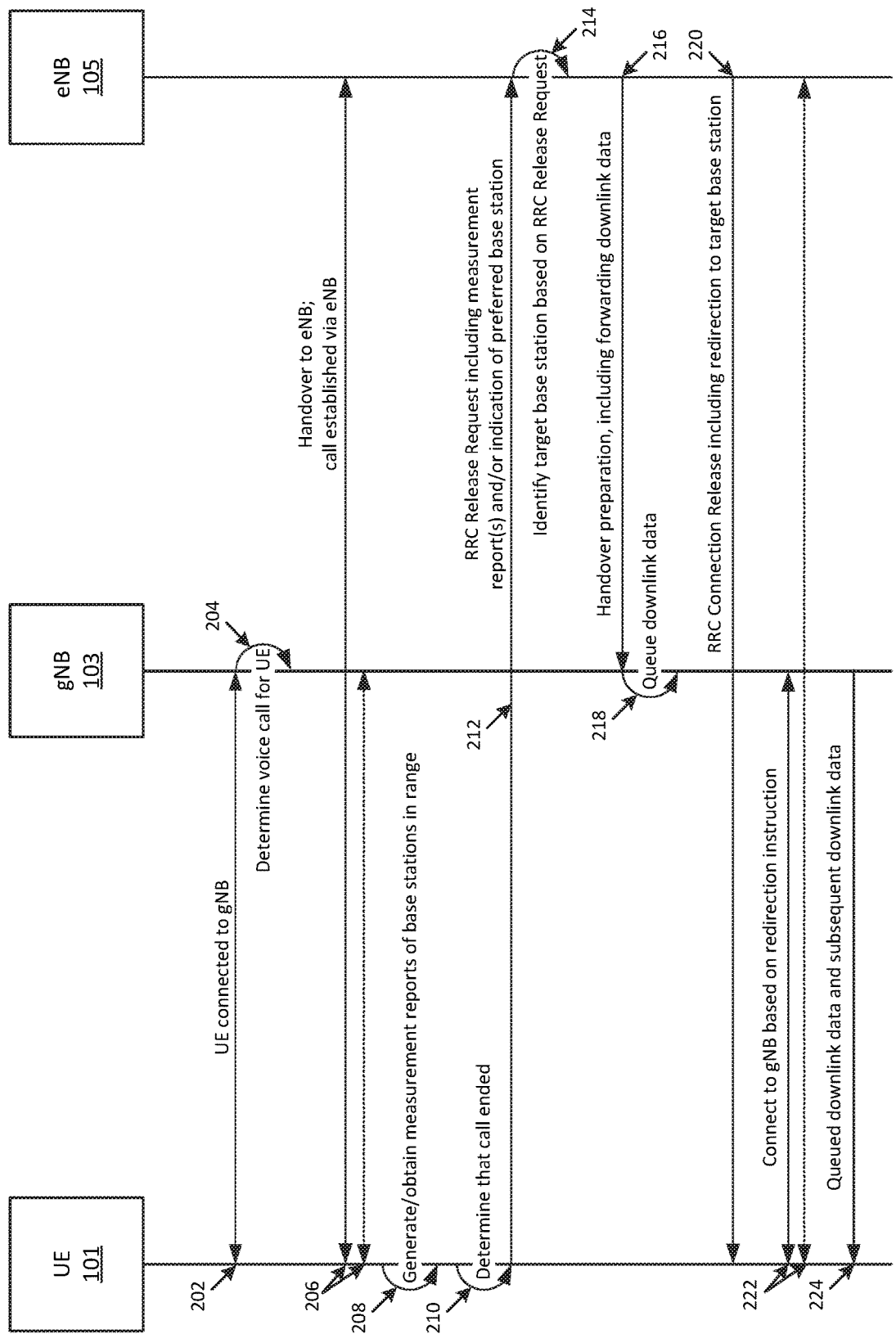
FIG. 2A provides an example signal flow in accordance with some embodiments to facilitate the fast return of a UE to a 5G RAN after being redirected to another RAN based on a request from the UE.

FIG. 2A provides an example signal flow in accordance with some embodiments to facilitate the fast return of UE 101 to a 5G RAN after being redirected to another RAN (e.g., a LTE RAN). As noted above, the redirection may be part of a fallback procedure, such as a LTE fallback or EPS fallback procedure occurring in response to a voice call being placed by or to UE 101, and/or in response to some other triggering event. Example signals are provided in FIG. 2A for the sake of explanation. In practice, additional signals may be used to facilitate the handover of UE 101 from gNB 103 to eNB 105, or vice versa.

As shown, for example, UE 101 may be connected (at 202) to gNB 103, which may be implemented or may otherwise be associated with a 5G RAN. Via this connection, UE 101 may receive 5G service from gNB 103. For example, UE 101 may send and/or receive wireless communications to and/or from gNB 103 according to one or more 5G RATs or bands, such as a "Millimeter-Wave" band, a "Sub-6 GHz" band, or the like.

While UE 101 is connected to gNB 103, gNB 103 may determine (at 204) that a voice call has been placed by UE 101, and/or that a voice call has been placed to UE 101. For example, gNB 103 may receive a request or other type of indication of the voice call from UE 101, from an AMF (e.g., where the indication includes or is associated with a paging request), and/or from some other device or system.

Based on determining (at 204) that a voice call has been placed by or to UE 101, gNB 103 may initiate a fallback procedure, in which UE 101 is redirected to a RAN that implements a different RAT than the RAT (or RATs) implemented by gNB 103. For example, gNB 103 may initiate a LTE fallback procedure, an EPS fallback procedure, or the like, in which UE 101 is caused to connect to eNB 105. The fallback procedure may include gNB 103 outputting a handover request to a network element that is communicatively coupled to gNB 103 and that handles mobility, handovers, and/or other functions, such as an AMF. For example, in some embodiments, the handover request may include a "Handover Required" message from gNB 103 to the AMF (e.g., via a N2 interface). Additionally, or alternatively, gNB 103 may communicate with eNB 105 (e.g., via a X2 interface) to initiate or otherwise facilitate the handover. In some embodiments, as similarly described above, as part of the handover procedure, gNB 103 may indicate a "cause" associated with the handover, such as an indication that the handover is associated with a voice call placed by or to UE 101. As indicated by the dashed line (at 206) in the figure, once the handover to eNB 105 has been completed, UE 101 may disconnect from gNB 103 and/or may cease sending and/or receiving data to and/or from gNB 103.

As further shown, UE 101 may generate and/or obtain (at 208) measurement reports of base stations in range of UE 101. For example, UE 101 may, in an ongoing, periodic, and/or intermittent fashion, scan for base stations (e.g., eNBs, gNBs, etc.), and may determine measures of channel quality between UE 101 and any detected base stations. The measurement reports generated by UE 101 may indicate such measures of channel quality for each detected base station, such that the measurement reports may include or otherwise indicate a ranked list of base stations. In some embodiments, the measurement reports may be granular, in that the measurement reports indicate channel quality information for particular frequency bands, carriers, RATs, or the like. For example, UE 101 may determine first channel quality information for one set of bands associated with gNB 103 (e.g., a set of Sub-6 GHz frequencies) and may determine second channel quality information for another set of bands implemented by gNB 103 and/or another gNB (e.g., a set of mmWave frequencies).

After the handover has been performed and the call has been carried between UE 101 and eNB 105 (at 206), UE 101 may determine (at 210) that the call has ended. For example, a voice call application associated with UE 101 may receive a command from a user of UE 101 (e.g., a "hang up" command), UE 101 may receive an indication from a telephony or other type of application server associated with the voice call that the call has ended, or the like.

Based on determining (at 210) that the call has ended, UE 101 may output (at 212) one or more RRC messages to eNB 105. For example, in accordance with some embodiments, UE 101 may output a RRC Release Message or some other suitable request to redirect UE 101 to a RAN or base station other than eNB 105. For example, the request (e.g., the RRC Release Message) may include one or more measurement reports (e.g., as generated at 208), and/or an indication of a preferred gNB, RAT, frequency band, etc.

As further shown, eNB 105 may identify (at 214) gNB 103 as a target base station for the redirection of UE 101 (may determine that UE 101 should be handed over to gNB 103) based on the measurement reports. For example, eNB 105 may select (at 214) gNB 103 based on a signal quality indicated in the measurement report (e.g., compared to signal qualities associated with a set of base stations indicated in the report), may select gNB 103 based on a relative measure of load compared to other base stations, may select a particular RAT or band associated with gNB 103 based on Quality of Service ("QoS") factors, and/or may select gNB 103 from a set of candidate base stations based on one or more other factors. Additionally, or alternatively, the request from UE 101 (e.g., the RRC Release Message) may indicate a particular base station (e.g., gNB 103), RAT, band, or the like selected by UE 101. For example, UE 101 may indicate gNB 103 in the request (at 212) based on having previously being connected (at 202) to gNB 103.

In this manner, some embodiments may provide for a UE-selected target RAN, in situations where eNB 105 selects (at 214) a particular base station (e.g., gNB 103), RAT, frequency band, or the like based on an indication of preferred base station, RAT, frequency band, etc. included in the request (e.g., the RRC Release Request) from UE 101. Some embodiments provide for an eNB-selected target RAN, in situations where eNB 105 selects (at 214) a particular base station, RAT, frequency band, or the like, based on values included in measurement reports provided by UE 101. In some embodiments, eNB 105 may select (at 214) a target base station for UE 101 based on a combination of the factors discussed above, and/or one or more factors in addition to or in lieu of such factors.

As further shown, eNB 105 may output (at 216) an indication and/or request to gNB 103, indicating that gNB 103 has been selected as a handover target for UE 101. The indication may be considered as a request to prepare for the handover. For example, while not explicitly shown here, gNB 103 may reject the handover in some situations, such as if gNB 103 is congested or otherwise overloaded. In such scenarios, eNB 105 may select (at 214) a different handover target for UE 101 (e.g., based on measurement reports provided by UE 101), and/or may cease the handover process entirely, in which case UE 101 may remain connected to eNB 105.

In some embodiments, the preparation for the handover (e.g., in situations where gNB 103 accepts the handover request, and/or otherwise does not reject the handover request) may include forwarding downlink data to gNB 103. For example, eNB 105 may continue to receive downlink data from a core network (e.g., from a Packet Data Network ("PDN") Gateway ("PGW")), or some other source, for UE 101. In some embodiments, eNB 105 may buffer or queue the downlink data without sending the downlink data to UE 101. In some embodiments, eNB 105 may forward (e.g., via a X2 interface) the downlink data to gNB 103 as part of the handover preparation.

As further shown, gNB 103 may buffer and/or queue (at 218) the received downlink data. In some embodiments, gNB 103 may store an identifier of UE 101 (e.g., a GUTI, an IMEI value, etc.) with the data, in a manner that indicates that the received downlink data is associated with UE 101. Similarly, when similar processes are performed for other UEs (e.g., contemporaneously with the example process shown in FIG. 2A), gNB 103 may buffer and/or queue the respective downlink data associated with other UEs with respective identifiers associated with each of the other UEs.

Additionally, eNB 105 may output (at 220) an instruction to UE 101, instructing UE 101 to connect to the selected base station (e.g., gNB 103 in this example). The instruction may include an RRC Connection Release message with a redirection instruction. The RRC Connection Release message may instruct UE 101 to disconnect from eNB 105, and the redirection instruction may indicate that UE 101 should connect to (or attempt to connect to) gNB 103.

Based on the received instruction (at 220), UE 101 may connect (at 222) to gNB 103, identified in the instruction (e.g., the RRC Connection Release message). UE 101 may further disconnect (at 222) from gNB 103 (e.g., upon completion of successful connection to gNB 103). In some embodiments, while not explicitly shown here, in situations where UE 101 cannot successfully connect to gNB 103 (e.g., if gNB 103 is overloaded, UE 101 moves out of a coverage area associated with gNB 103, and/or the connection attempt is otherwise unsuccessful), UE 101 may indicate to eNB 105 that the connection to gNB 103 was unsuccessful. In such a scenario, as similarly discussed above, eNB 105 may select (at 214) a new target base station, and/or may cancel the redirection of UE 101 to another base station.

Once UE 101 has connected to gNB 103, gNB 103 may output (at 224) the queued downlink data for UE 101. In this manner, UE 101 may continue to receive downlink data (e.g., from a core network with minimal interruption.

Figure 2B:
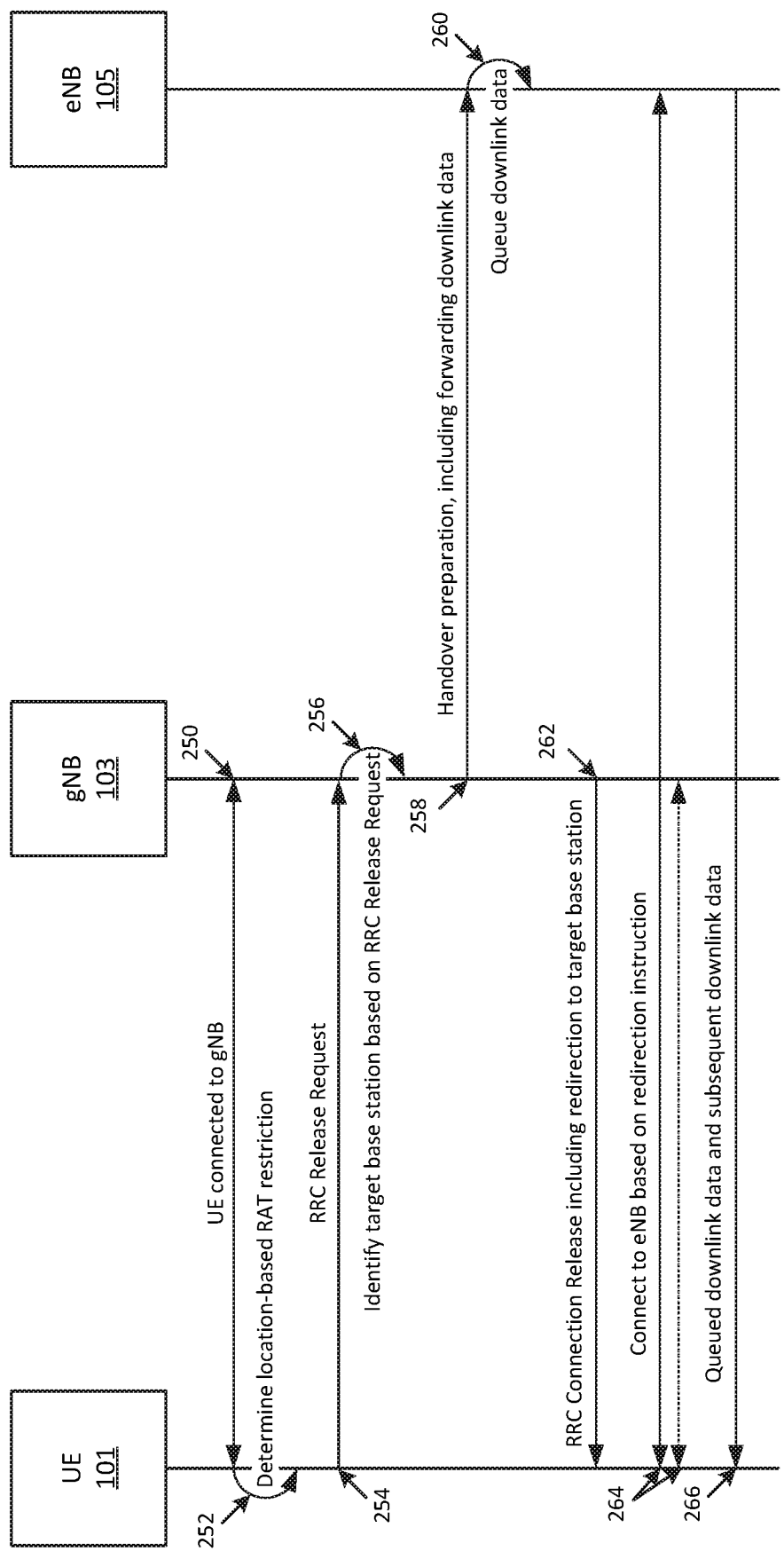
FIG. 2B provides an example signal flow in accordance with some embodiments to facilitate the UE-initiated release of a UE from a particular RAN, based on detection by the UE of a location-based RAT restriction.

FIG. 2B illustrates an example of a UE-initiated release of UE 101 from a particular RAN (e.g., a RAN implemented by gNB 103), based on detection by UE 101 of a location-based RAT restriction. For example, in some embodiments, UE 101 may be configured to monitor location information associated with UE 101 using a Global Positioning System ("GPS")-based location determination technique, a network-based triangulation location determination technique, and/or some other suitable technique for monitoring the location of UE 101. In some embodiments, UE 101 may further be configured to refrain from communicating via particular RATs, bands, etc., when in certain locations or regions. For example, such locations or regions may be associated with satellite dishes, in which communications via particular RATs (e.g., a 5G RAT, a LTE RAT, etc.) may interfere with communications associated with the satellite dishes. In other scenarios, such locations or regions may have location-based RAT restrictions for other reasons. In accordance with embodiments described herein, a RRC Release Request message may be used by UE 101 to initiate a UE-initiated connection release in order to avoid using restricted RATs in such locations.

For example, as shown in FIG. 2B, UE 101 may be connected (at 250) to gNB 103. At some point, UE 101 may determine (at 252) that UE 101 is located in, located near (e.g., within a threshold distance of), or is approaching a location in which one or more RATs, such as a RAT being used by UE 101 to communicate with gNB 103, is restricted. For example, the location of UE 101 may be within a threshold location of a satellite dish, for which 5G communications (e.g., where UE 101 and gNB 103 communicate via a 5G RAT) may disrupt or interfere with the communications capabilities of the satellite dish.

Based on determining (at 252) that UE 101 is located in or near the location associated with the location-based RAT restriction, UE 101 may output (at 254) a RRC Release Request to gNB 103. In some embodiments, as similarly discussed above, the RRC Release Request may include measurement reports, an indication of a preferred target base station, and/or other suitable information. In some embodiments, the RRC Release Request (at 254) may include an indication of one or more restricted RATs, such as a RAT that is restricted from being used at the location associated with UE 101.

As further shown, gNB 103 may identify (at 256) a target base station for UE 101 based on the RRC Release Request. For example, as similarly discussed above, gNB 103 may identify the target base station based on measurement reports from UE 101, an indication of preferred base station or RAT, and/or using some other suitable selection procedure. In this example, gNB 103 may identify (at 256) eNB 105 as the target base station for UE 101. For example, gNB 103 may identify that eNB 105 is not associated with a restricted RAT (e.g., in situations where UE 101 indicates (at 254) restricted RATs, and/or where gNB 103 otherwise determines that the location of UE 101 is associated with particular restricted RATs). Additionally, or alternatively, for example, gNB 103 may determine that eNB 105 is indicated as a preferred target base station for UE 101 based on preference from UE 101. While the target base station in this example is an eNB, in practice, the target base station may be another gNB and/or another type of base station that implements another RAT.

As further shown, gNB 103 may output (at 258) one or more messages to eNB 105 to prepare for a handover of UE 101 to eNB 105, including forwarding downlink data for UE 101. As similarly discussed above, eNB 105 may buffer, queue, etc. (at 260) the downlink data for UE 101. Additionally, gNB 103 may output (at 262) a RRC Connection Release message to UE 101, including a redirection instruction (e.g., an instruction to connect to eNB 105). UE 101 may accordingly connect (at 264) to eNB 105, and may disconnect from gNB 103. Once UE 101 has connected to eNB 105, eNB 105 may output (at 266) the queued downlink data, as well as subsequent downlink data, to UE 101.

Figure 3:
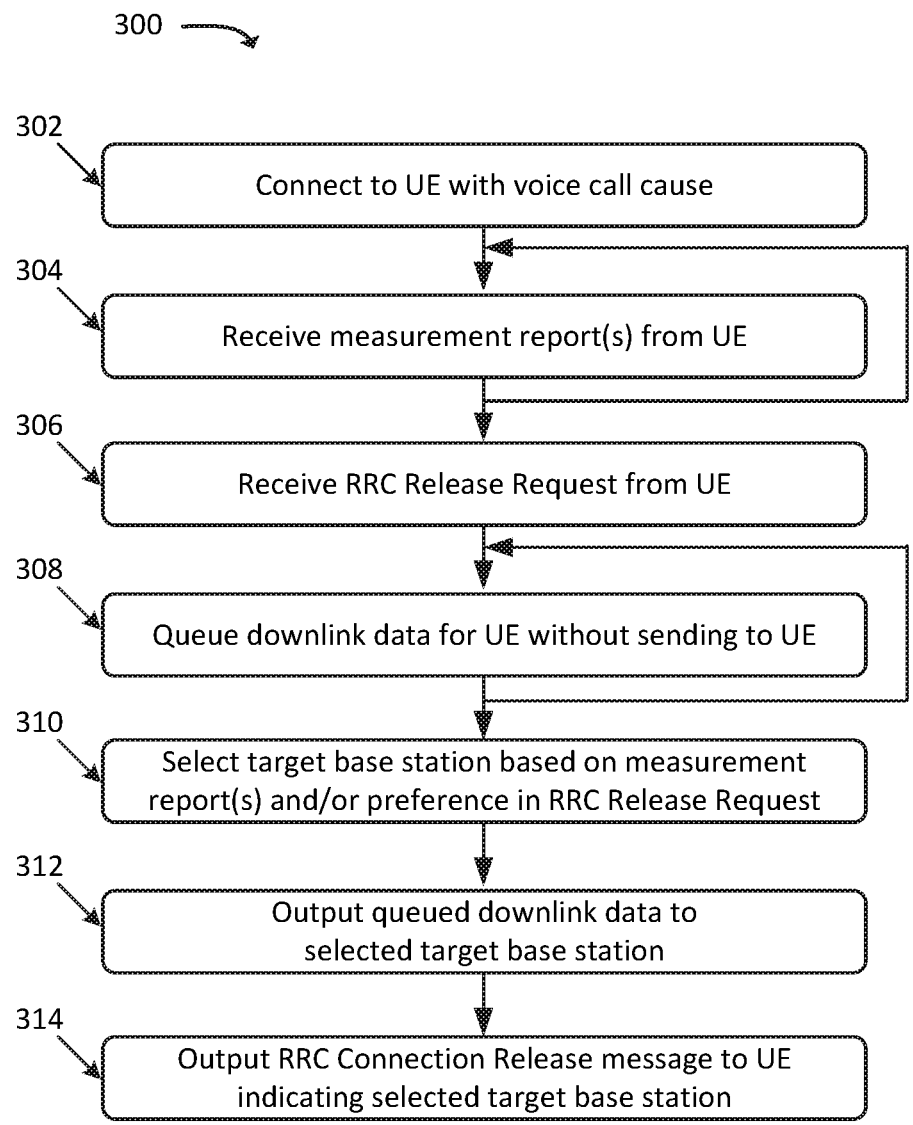
FIG. 3 illustrates an example process for facilitating the redirection of a UE to a RAN based on a request from the UE, in accordance with some embodiments.

FIG. 3 illustrates an example process 300 for redirecting UE 101 to a different RAN or base station (e.g., gNB 103) based on an indication that a voice call associated with UE 101 has ended (and/or otherwise based on a request from UE 101). In some embodiments, some or all of process 300 may be performed by eNB 105. In some embodiments, one or more other devices may perform some or all of process 300 (e.g., in concert with, and/or in lieu of, eNB 105).

As shown, process 300 may include connecting (at 302) to UE 101 with a voice call cause. For example, UE 101 may be redirected to eNB 105 as part of a fallback procedure, in which UE 101 may be redirected to eNB 105 for voice services when UE 101 is connected to a different type of RAN or base station when placing or receiving a voice call. For example, UE 101 may previously have been connected to gNB 103, which may, in some circumstances, not support voice services (or may redirect UE 101 for other reasons). In some embodiments, one or more messages received by eNB 105 to initiate the redirection or connection of UE 101 to eNB 105 may include a "cause" or other indicator that the redirection or connection is associated with a voice call for UE 101.

Process 300 may further include receiving (at 304) one or more measurement reports from UE 101, while UE 101 is connected to eNB 105. For example, UE 101 may provide the measurement reports periodically, intermittently, in response to requests for measurement reports, and/or on some other basis. The measurement reports may indicate the presence of base stations in range of UE 101, which may include gNB 103, one or more other gNBs, one or more other eNBs, and/or one or more other types of base stations. As noted above, the measurement reports may include channel quality metrics or other types of metrics associated with the base stations, and/or with individual RATs, bands, or the like implemented by the base stations.

Process 300 may additionally include receiving (at 306) a RRC Release Request from UE 101. For example, UE 101 may output the request upon the end of a voice call in which UE 101 is involved, and/or upon the occurrence of some other event. In some embodiments, the RRC Release Request may include an indication of a preferred base station (e.g., gNB 103), RAT, band, etc. selected by UE 101. For example, in some embodiments, the indicated preferred base station may be a particular gNB 103 to which UE 101 was last connected (e.g., prior to placing or receiving the voice call).

Process 300 may also include queuing (at 308) downlink data for UE 101, without sending the data to UE 101. As noted above, forgoing sending the downlink data to UE 101 may allow UE 101 to be redirected to another base station, in embodiments where UE 101 is configured to only participate in a redirection or reselection process when not receiving data from a RAN. As indicated by the arrow looping back to block 308 in FIG. 3, eNB 105 may continue to queue (at 308) downlink data for UE 101 in between the time that the RRC Release Request is received (at 306) from UE 101, and the time that the redirection of UE 101 to a selected target base station is complete (or is canceled, as mentioned above).

Process 300 may also include selecting (at 310) a target base station, RAT, band, etc. based on the received measurement reports and/or a preference indicated in the RRC Release Request. For example, as discussed above, eNB 105 may select the target base station based on the preference from UE 101, if such preference is included in the RRC Release Request. Additionally, or alternatively, eNB 105 may use such preference as a factor in selecting the target base station, RAT, band, etc. For example, eNB 105 may select the target base station, RAT, band, etc. based on values included in the measurement reports and further based on the indicated preference. In some embodiments, eNB 105 may select the target base station, RAT, band, etc. based solely on values included in measurement reports, and/or based on one or more other factors.

Process 300 may additionally include outputting (at 312) the queued downlink data to the selected target base station. For example, eNB 105 may output (e.g., via a X2 interface) the queued downlink data to gNB 103 (selected at 310).

Process 300 may further include outputting (at 314) a RRC Connection Release message to UE 101, indicating the selected target base station. Based on this message, UE 101 may connect to the indicated target base station, RAT, band, etc. (e.g., gNB 103, and/or a particular RAT or band implemented by gNB 103).

Figure 4:
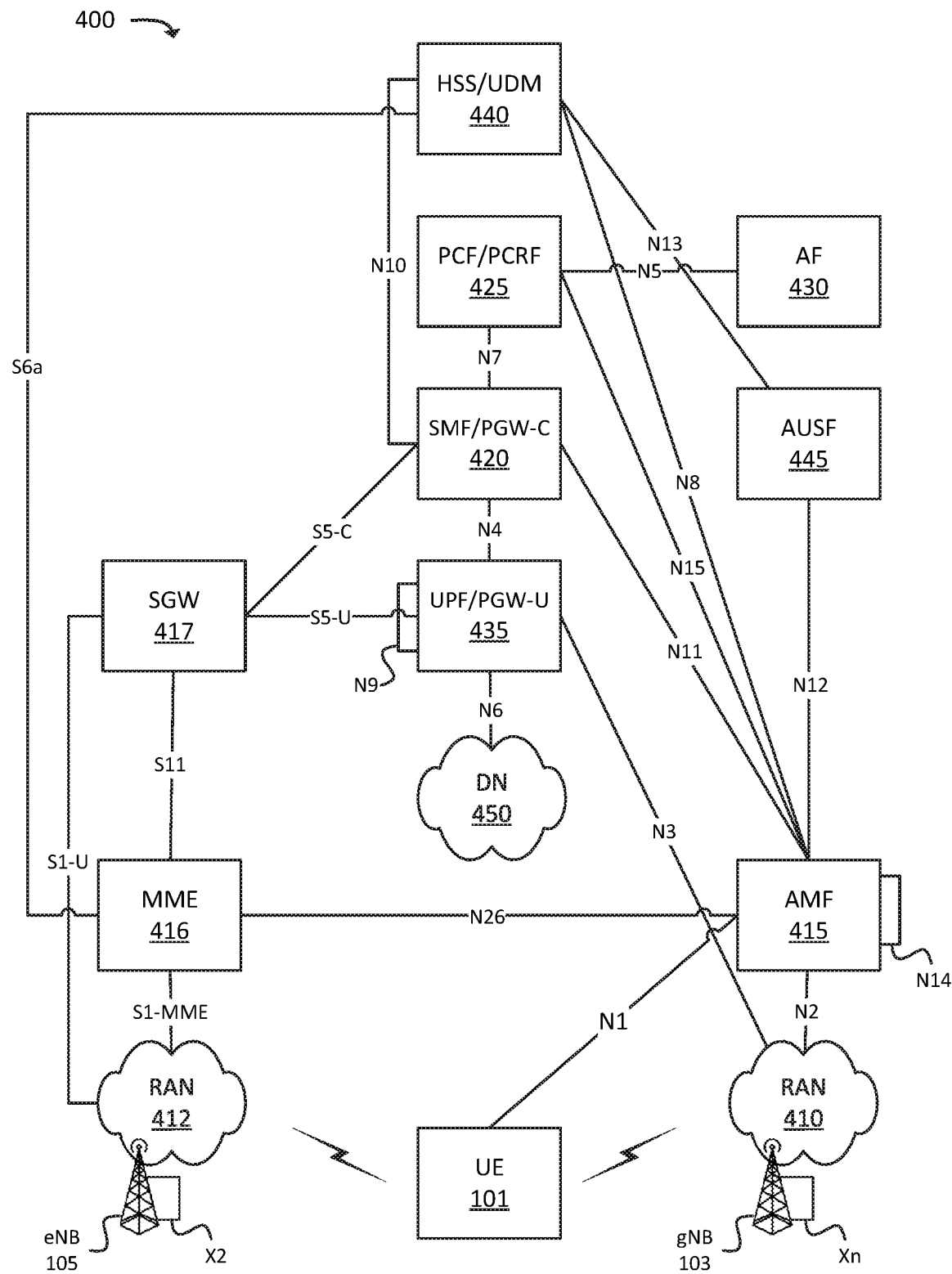
FIG. 4 illustrates an example environment in which one or more embodiments, described herein, may be implemented.

FIG. 4 illustrates an example environment 400, in which one or more embodiments may be implemented. In some embodiments, environment 400 may correspond to a 5G network, and/or may include elements of a 5G network. In some embodiments, environment 400 may correspond to a 5G NSA architecture, in which a 5G RAT may be used in conjunction with one or more other RATs (e.g., a LTE RAT), and/or in which elements of a 5G core network may be implemented by, may be communicatively coupled with, and/or may include elements of another type of core network (e.g., an EPC). As shown, environment 400 may include UE 101, RAN 410 (which may include one or more Next Generation Node Bs ("gNBs") 103), RAN 412 (which may include one or more one or more evolved Node Bs ("eNBs") 105), and various network functions such as AMF 415, MME 416, Serving Gateway ("SGW") 417, Session Management Function ("SMF")/PGW-Control plane function ("PGW-C") 420, Policy Control Function ("PCF")/Policy Charging and Rules Function ("PCRF") 425, Application Function ("AF") 430, User Plane Function ("UPF")/PGW-User plane function ("PGW-U") 435, Home Subscriber Server ("HSS")/Unified Data Management ("UDM") 440, and Authentication Server Function ("AUSF") 445. Environment 400 may also include one or more networks, such as Data Network ("DN") 450.

The example shown in FIG. 4 illustrates one instance of each network component or function (e.g., one instance of SMF/PGW-C 420, PCF/PCRF 425, UPF/PGW-U 435, HSS/UDM 440, and/or 445). In practice, environment 400 may include multiple instances of such components or functions. For example, in some embodiments, environment 400 may include multiple "slices" of a core network, where each slice includes a discrete set of network functions (e.g., one slice may include a first instance of SMF/PGW-C 420, PCF/PCRF 425, UPF/PGW-U 435, HSS/UDM 440, and/or 445, while another slice may include a second instance of SMF/PGW-C 420, PCF/PCRF 425, UPF/PGW-U 435, HSS/UDM 440, and/or 445). The different slices may provide differentiated levels of service, such as service in accordance with different QoS parameters.

The quantity of devices and/or networks, illustrated in FIG. 4, is provided for explanatory purposes only. In practice, environment 400 may include additional devices and/or networks, fewer devices and/or networks, different devices and/or networks, or differently arranged devices and/or networks than illustrated in FIG. 4. For example, while not shown, environment 400 may include devices that facilitate or enable communication between various components shown in environment 400, such as routers, modems, gateways, switches, hubs, etc. Alternatively, or additionally, one or more of the devices of environment 400 may perform one or more network functions described as being performed by another one or more of the devices of environment 400. Devices of environment 400 may interconnect with each other and/or other devices via wired connections, wireless connections, or a combination of wired and wireless connections. In some implementations, one or more devices of environment 400 may be physically integrated in, and/or may be physically attached to, one or more other devices of environment 400.

UE 101 may include a computation and communication device, such as a wireless mobile communication device that is capable of communicating with RAN 410, RAN 412, and/or DN 450. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 101 may send traffic to and/or receive traffic (e.g., user plane traffic) from DN 450 via RAN 410, RAN 412, and/or UPF/PGW-U 435. In some embodiments, UE 101 may perform one or more operations described above, such as the requesting of a redirection to gNB 103 after being redirected from gNB 103 to eNB 105 for voice call services, and the ensuing connection to gNB 103 when receiving an appropriate instruction from eNB 105.

RAN 410 may be, or may include, a 5G RAN that includes one or more base stations (e.g., one or more gNBs 103), via which UE 101 may communicate with one or more other elements of environment 400. UE 101 may communicate with RAN 410 via an air interface (e.g., as provided by gNB 103). For instance, RAN 410 may receive traffic (e.g., voice call traffic, data traffic, messaging traffic, signaling traffic, etc.) from UE 101 via the air interface, and may communicate the traffic to UPF/PGW-U 435, and/or one or more other devices or networks. Similarly, RAN 410 may receive traffic intended for UE 101 (e.g., from UPF/PGW-U 435, AMF 415, and/or one or more other devices or networks) and may communicate the traffic to UE 101 via the air interface. In some embodiments, gNB 103 may perform one or more operations described above, such as the receiving and forwarding of queued downlink data from eNB 105 during a redirection of UE 101 to gNB 103.

RAN 412 may be, or may include, a LTE RAN that includes one or more base stations (e.g., one or more eNBs 105), via which UE 101 may communicate with one or more other elements of environment 400. UE 101 may communicate with RAN 412 via an air interface (e.g., as provided by eNB 105). For instance, RAN 410 may receive traffic (e.g., voice call traffic, data traffic, messaging traffic, signaling traffic, etc.) from UE 101 via the air interface, and may communicate the traffic to UPF/PGW-U 435, and/or one or more other devices or networks. Similarly, RAN 410 may receive traffic intended for UE 101 (e.g., from UPF/PGW-U 435, SGW 417, and/or one or more other devices or networks) and may communicate the traffic to UE 101 via the air interface. In some embodiments, eNB 105 may perform one or more operations described above, such as the redirection of UE 101 to gNB 103 after being receiving a request or indication (e.g., an indication that a voice call associated with UE 101 has ended) from UE 101.

AMF 415 may include one or more devices, systems, Virtualized Network Functions ("VNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 410 and/or gNBs 103, and/or to perform other operations. In some embodiments, the 5G network may include multiple AMFs 415, which communicate with each other via the N14 interface (denoted in FIG. 4 by the line marked "N14" originating and terminating at AMF 415).

MME 416 may include one or more devices, systems, VNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 412 and/or eNBs 105, and/or to perform other operations.

SGW 417 may include one or more devices, systems, VNFs, etc., that aggregate traffic received from one or more eNBs 105 and send the aggregated traffic to an external network or device via UPF/PGW-U 435. Additionally, SGW 417 may aggregate traffic received from one or more UPF/PGW-Us 435 and may send the aggregated traffic to one or more eNBs 105. SGW 417 may operate as an anchor for the user plane during inter-eNB handovers and as an anchor for mobility between different telecommunication networks or RANs (e.g., RANs 410 and 412).

SMF/PGW-C 420 may include one or more devices, systems, VNFs, etc., that gather, process, store, and/or provide information in a manner described herein. SMF/PGW-C 420 may, for example, facilitate in the establishment of communication sessions on behalf of UE 101. In some embodiments, the establishment of communications sessions may be performed in accordance with one or more policies provided by PCF/PCRF 425.

PCF/PCRF 425 may include one or more devices, systems, VNFs, etc., that aggregate information to and from the 5G network and/or other sources. PCF/PCRF 425 may receive information regarding policies and/or subscriptions from one or more sources, such as subscriber databases and/or from one or more users (such as, for example, an administrator associated with PCF/PCRF 425).

AF 430 may include one or more devices, systems, VNFs, etc., that receive, store, and/or provide information that may be used in determining parameters (e.g., quality of service parameters, charging parameters, or the like) for certain applications.

UPF/PGW-U 435 may include one or more devices, systems, VNFs, etc., that receive, store, and/or provide data (e.g., user plane data). For example, UPF/PGW-U 435 may receive user plane data (e.g., voice call traffic, data traffic, etc.), destined for UE 101, from DN 450, and may forward the user plane data toward UE 101 (e.g., via RAN 410, SMF/PGW-C 420, and/or one or more other devices). In some embodiments, multiple UPFs 435 may be deployed (e.g., in different geographical locations), and the delivery of content to UE 101 may be coordinated via the N9 interface (e.g., as denoted in FIG. 4 by the line marked "N9" originating and terminating at UPF/PGW-U 435). Similarly, UPF/PGW-U 435 may receive traffic from UE 101 (e.g., via RAN 410, SMF/PGW-C 420, and/or one or more other devices), and may forward the traffic toward DN 450. In some embodiments, UPF/PGW-U 435 may communicate (e.g., via the N4 interface) with SMF/PGW-C 420, regarding user plane data processed by UPF/PGW-U 435.

HSS/UDM 440 and AUSF 445 may include one or more devices, systems, VNFs, etc., that manage, update, and/or store, in one or more memory devices associated with AUSF 445 and/or HSS/UDM 440, profile information associated with a subscriber. AUSF 445 and/or HSS/UDM 440 may perform authentication, authorization, and/or accounting operations associated with the subscriber and/or a communication session with UE 101.

DN 450 may include one or more wired and/or wireless networks. For example, DN 450 may include an Internet Protocol ("IP")-based PDN, a wide area network ("WAN") such as the Internet, a private enterprise network, and/or one or more other networks. UE 101 may communicate, through DN 450, with data servers, other UEs 101, and/or to other servers or applications that are coupled to DN 450. DN 450 may be connected to one or more other networks, such as a public switched telephone network ("PSTN"), a public land mobile network ("PLMN"), and/or another network. DN 450 may be connected to one or more devices, such as content providers, applications, web servers, and/or other devices, with which UE 101 may communicate.

Figure 5:
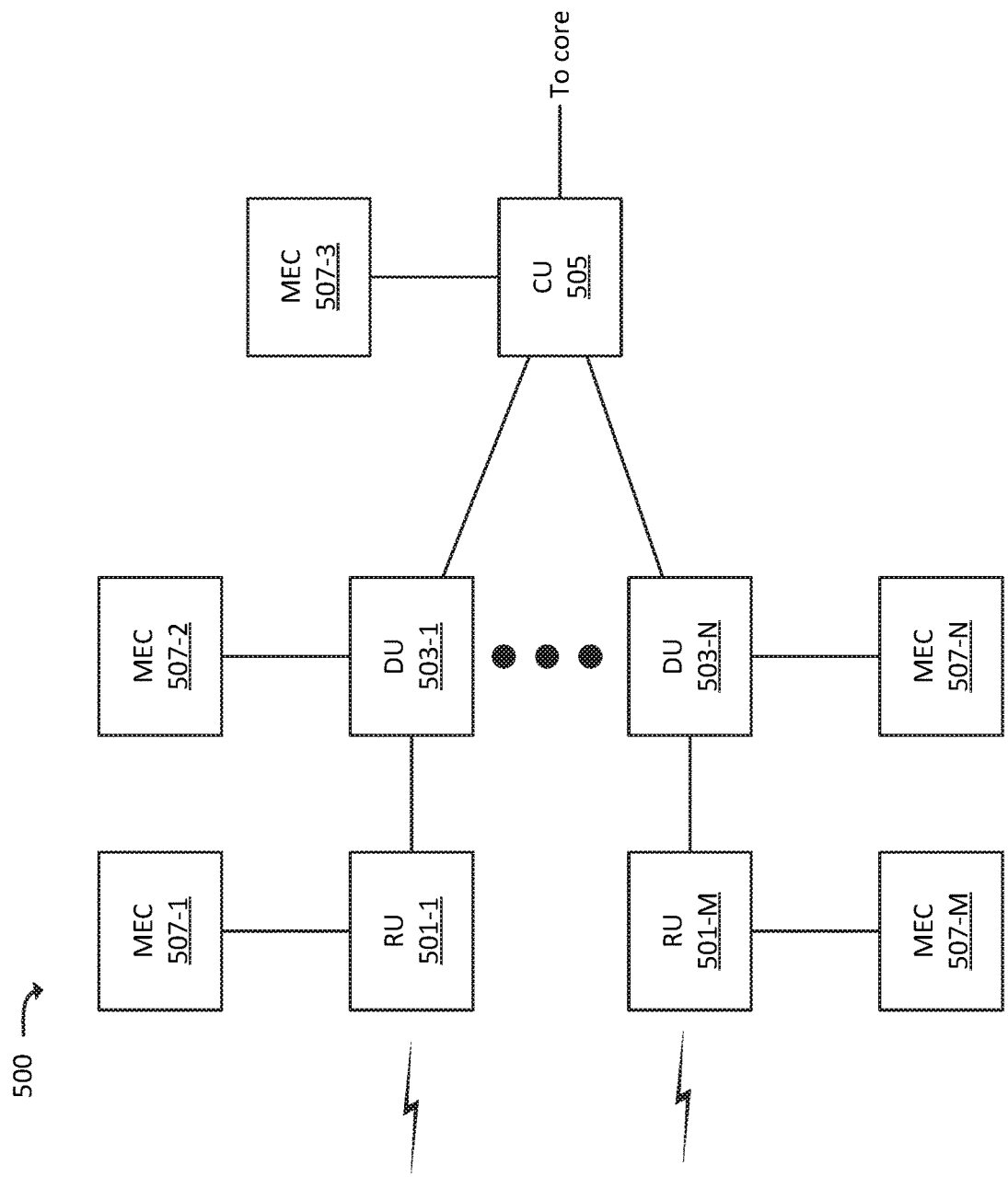
FIG. 5 illustrates an example arrangement of a RAN, in accordance with some embodiments.

FIG. 5 illustrates an example Distributed Unit ("DU") network 500, which may be included in and/or implemented by one or more RANs (e.g., RAN 410). In some embodiments, a particular RAN may include one DU network 500. In some embodiments, a particular RAN may include multiple DU networks 500. In some embodiments, DU network 500 may correspond to a particular gNB 103 of a 5G RAN (e.g., RAN 410). In some embodiments, DU network 500 may correspond to multiple gNBs 103. In some embodiments, DU network 500 may correspond to one or more other types of base stations of one or more other types of RANs. As shown, DU network 500 may include Central Unit ("CU") 505, one or more Distributed Units ("DUs") 503-1 through 503-N (referred to individually as "DU 503," or collectively as "DUs 503"), and one or more Radio Units ("RUs") 501-1 through 501-M (referred to individually as "RU 501," or collectively as "RUs 501").

CU 505 may communicate with a core of a wireless network (e.g., may communicate with one or more of the devices or systems described above with respect to FIG. 4, such as AMF 415 and/or UPF/PGW-U 435). In the uplink direction (e.g., for traffic from UEs 101 to a core network), CU 505 may aggregate traffic from DUs 503, and forward the aggregated traffic to the core network. In some embodiments, CU 505 may receive traffic according to a given protocol (e.g., Radio Link Control ("RLC")) from DUs 503, and may perform higher-layer processing (e.g., may aggregate/process RLC packets and generate Packet Data Convergence Protocol ("PDCP") packets based on the RLC packets) on the traffic received from DUs 503.

In accordance with some embodiments, CU 505 may receive downlink traffic (e.g., traffic from the core network) for a particular UE 101, and may determine which DU(s) 503 should receive the downlink traffic. DU 503 may include one or more devices that transmit traffic between a core network (e.g., via CU 505) and UE 101 (e.g., via a respective RU 501). DU 503 may, for example, receive traffic from RU 501 at a first layer (e.g., physical ("PHY") layer traffic, or lower PHY layer traffic), and may process/aggregate the traffic to a second layer (e.g., upper PHY and/or RLC). DU 503 may receive traffic from CU 505 at the second layer, may process the traffic to the first layer, and provide the processed traffic to a respective RU 501 for transmission to UE 101.

RU 501 may include hardware circuitry (e.g., one or more RF transceivers, antennas, radios, and/or other suitable hardware) to communicate wirelessly (e.g., via an RF interface) with one or more UEs 101, one or more other DUs 503 (e.g., via RUs 501 associated with DUs 503), and/or any other suitable type of device. In the uplink direction, RU 501 may receive traffic from UE 101 and/or another DU 503 via the RF interface and may provide the traffic to DU 503. In the downlink direction, RU 501 may receive traffic from DU 503, and may provide the traffic to UE 101 and/or another DU 503.

RUs 501 may, in some embodiments, be communicatively coupled to one or more Multi-Access/Mobile Edge Computing ("MEC") devices, referred to sometimes herein simply as ("MECs") 507. For example, RU 501-1 may be communicatively coupled to MEC 507-1, RU 501-M may be communicatively coupled to MEC 507-M, DU 503-1 may be communicatively coupled to MEC 507-2, DU 503-N may be communicatively coupled to MEC 507-N, CU 505 may be communicatively coupled to MEC 507-3, and so on. MECs 507 may include hardware resources (e.g., configurable or provisionable hardware resources) that may be configured to provide services and/or otherwise process traffic to and/or from UE 101, via a respective RU 501.

For example, RU 501-1 may route some traffic, from UE 101, to MEC 507-1 instead of to a core network (e.g., via DU 503 and CU 505). MEC 507-1 may process the traffic, perform one or more computations based on the received traffic, and may provide traffic to UE 101 via RU 501-1. In this manner, ultra-low latency services may be provided to UE 101, as traffic does not need to traverse DU 503, CU 505, and an intervening backhaul network between DU network 500 and the core network.

In some embodiments, MEC 507 may include, and/or may implement some or all of the functionality described above with respect to eNB 105. For example, a particular MEC 507 that is communicatively coupled to eNB 105 may select a target base station for UE 101 (e.g., as described with respect to FIG. 3 at block 310), and/or may perform other functions described above.

Figure 6:
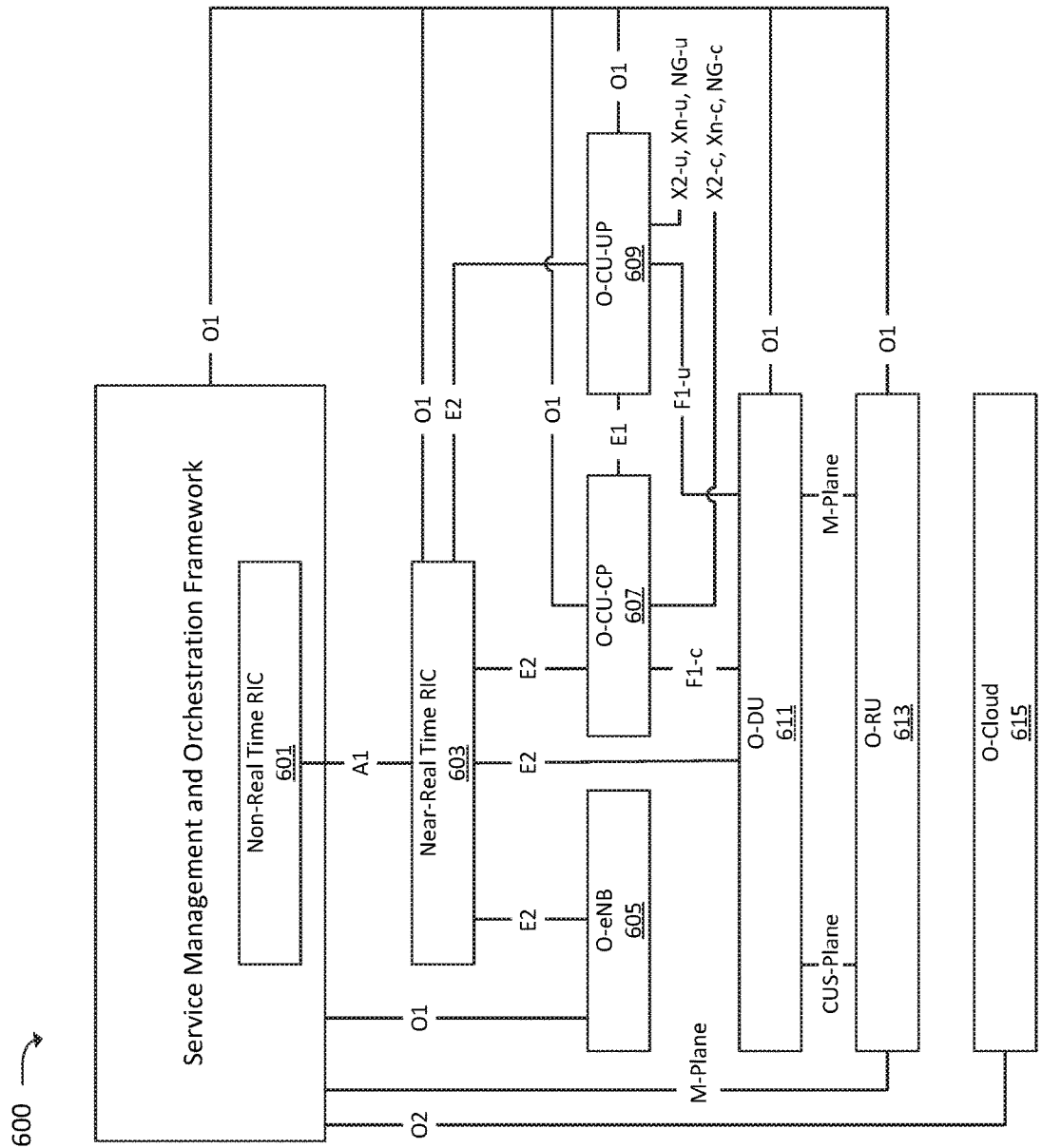
FIG. 6 illustrates an example arrangement of an Open RAN ("O-RAN") environment in which one or more embodiments, described herein, may be implemented.

FIG. 6 illustrates an example O-RAN environment 600, which may correspond to RAN 410, RAN 412, and/or DU network 500. For example, RAN 410, RAN 412, and/or DU network 500 may include one or more instances of O-RAN environment 600, and/or one or more instances of O-RAN environment 600 may implement RAN 410, RAN 412, DU network 500, and/or some portion thereof. As shown, O-RAN environment 600 may include Non-Real Time Radio Intelligent Controller ("RIC") 601, Near-Real Time RIC 603, O-eNB 605, O-CU-Control Plane ("O-CU-CP") 607, O-CU-User Plane ("O-CU-UP") 609, O-DU 611, O-RU 613, and O-Cloud 615. In some embodiments, O-RAN environment 600 may include additional, fewer, different, and/or differently arranged components.

In some embodiments, some or all of the elements of O-RAN environment 600 may be implemented by one or more configurable or provisionable resources, such as virtual machines, cloud computing systems, physical servers, and/or other types of configurable or provisionable resources. In some embodiments, some or all of O-RAN environment 600 may be implemented by, and/or communicatively coupled to, one or more MECs 507.

Non-Real Time MC 601 and Near-Real Time RIC 603 may receive performance information (and/or other types of information) from one or more sources, and may configure other elements of O-RAN environment 600 based on such performance or other information. For example, Near-Real Time RIC 603 may receive performance information, via one or more E2 interfaces, from O-eNB 605, O-CU-CP 607, and/or O-CU-UP 609, and may modify parameters associated with O-eNB 605, O-CU-CP 607, and/or O-CU-UP 609 based on such performance information. Similarly, Non-Real Time RIC 601 may receive performance information associated with O-eNB 605, O-CU-CP 607, O-CU-UP 609, and/or one or more other elements of O-RAN environment 600 and may utilize machine learning and/or other higher level computing or processing to determine modifications to the configuration of O-eNB 605, O-CU-CP 607, O-CU-UP 609, and/or other elements of O-RAN environment 600. In some embodiments, Non-Real Time RIC 601 may generate machine learning models based on performance information associated with O-RAN environment 600 or other sources, and may provide such models to Near-Real Time RIC 603 for implementation.

O-eNB 605 may perform functions similar to those described above with respect to eNB 105. For example, O-eNB 605 may facilitate wireless communications between UE 101 and a core network. O-CU-CP 607 may perform control plane signaling to coordinate the aggregation and/or distribution of traffic via one or more DUs 503, which may include and/or be implemented by one or more O-DUs 611, and O-CU-UP 609 may perform the aggregation and/or distribution of traffic via such DUs 503 (e.g., O-DUs 611). O-DU 611 may be communicatively coupled to one or more RUs 501, which may include and/or may be implemented by one or more O-RUs 613. In some embodiments, O-Cloud 615 may include or be implemented by one or more MECs 507, which may provide services, and may be communicatively coupled, to O-CU-CP 607, O-CU-UP 609, O-DU 611, and/or O-RU 613 (e.g., via an O1 and/or O2 interface).

Figure 7:
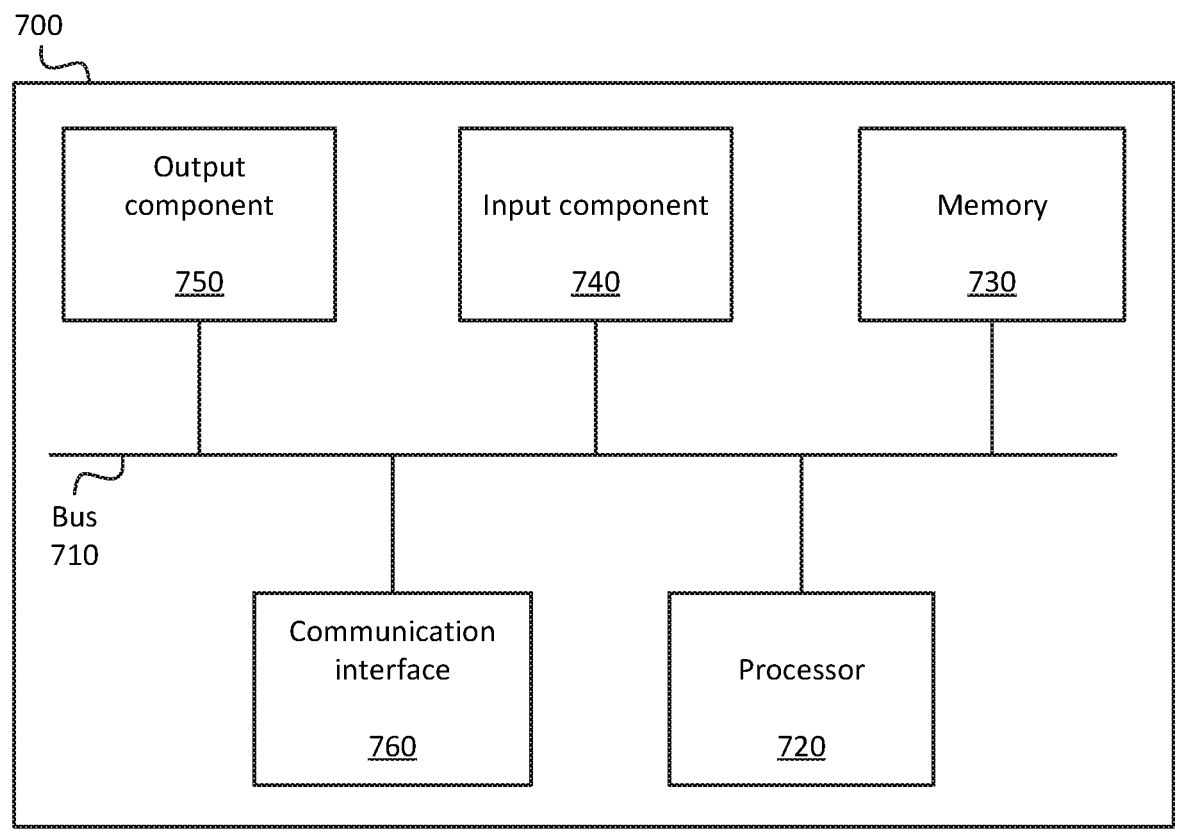
FIG. 7 illustrates example components of one or more devices, in accordance with one or more embodiments described herein.

FIG. 7 illustrates example components of device 700. One or more of the devices described above may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device

700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700 and/or other receives or detects input from a source external to 740, such as a touchpad, a touchscreen, a keyboard, a keypad, a button, a switch, a microphone or other audio input component, etc. In some embodiments, input component 740 may include, or may be communicatively coupled to, one or more sensors, such as a motion sensor (e.g., which may be or may include a gyroscope, accelerometer, or the like), a location sensor (e.g., GPS-based location sensor or some other suitable type of location sensor or location determination component), a thermometer, a barometer, and/or some other type of sensor. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A-1C, 2A, 2B, and 3), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:
1. A device, comprising:
 a wireless communication interface; and
 one or more processors configured to:
  communicate with a User Equipment ("UE") via the wireless communication interface;

receive an indication that the UE is connected to the device for a voice call;
receive a request from the UE to disconnect the UE from the device, wherein the UE outputs the request based on determining that the voice call has ended;
identify a target radio access network ("RAN") for the UE based on the request to disconnect the UE;
receive downlink data for the UE after receiving the request from the UE;
store the received downlink data for the UE without sending the downlink data to the UE, based on receiving the request from the UE and further based on receiving the indication that the UE is connected to the device for the voice call;
instruct the UE to connect to the target RAN;
receive an indication that the UE has connected to the target RAN; and
output the stored downlink data to the target RAN based on receiving the indication that the UE has connected to the target RAN.

2. The device of claim 1, wherein the request from the UE includes one or more Radio Resource Control ("RRC") messages.

3. The device of claim 1, wherein the request from the UE includes an identifier associated with the target RAN, wherein identifying the target RAN is based on the identifier included in the request.

4. The device of claim 1, wherein the one or more processors are further configured to:
receive, from the UE, one or more measurement reports associated with a plurality of candidate RANs, and
wherein identifying the target RAN includes selecting a particular one of the plurality of candidate RANs based on the one or more measurement reports.

5. The device of claim 1, wherein the device is associated with a first radio access technology ("RAT"), and wherein the target RAN is associated with a second RAT.

6. The device of claim 1, wherein instructing the UE to connect to the target RAN includes outputting a redirection instruction to the UE.

7. The device of claim 1, wherein the UE determines that the voice call has ended based on receiving an indication from a telephony application server associated with the voice call.

8. A non-transitory computer-readable medium, storing a plurality of processor-executable instructions to:
communicate with a User Equipment ("UE") via a wireless communication interface;
receive an indication that the UE is connected via the wireless communication interface for a voice call;
receive a disconnection request from the UE, wherein the UE outputs the disconnection request based on determining that the voice call has ended;
identify a target radio access network ("RAN") for the UE based on the disconnection request;
receive downlink data for the UE after receiving the disconnection request from the UE;
store the received downlink data for the UE without sending the downlink data to the UE, based on receiving the disconnection request from the UE and further based on receiving the indication that the UE is connected via the wireless communication interface for the voice call;
instruct the UE to connect to the target RAN;
receive an indication that the UE has connected to the target RAN; and
output the stored downlink data to the target RAN based on receiving the indication that the UE has connected to the target RAN.

9. The non-transitory computer-readable medium of claim 8, wherein the disconnection request from the UE includes one or more Radio Resource Control ("RRC") messages.

10. The non-transitory computer-readable medium of claim 8, wherein the disconnection request from the UE includes an identifier associated with the target RAN, wherein identifying the target RAN is based on the identifier included in the disconnection request.

11. The non-transitory computer-readable medium of claim 8, wherein the plurality of processor-executable instructions further include processor-executable instructions to:
receive, from the UE, one or more measurement reports associated with a plurality of candidate RANs, and
wherein identifying the target RAN includes selecting a particular one of the plurality of candidate RANs based on the one or more measurement reports.

12. The non-transitory computer-readable medium of claim 8, wherein the communication with the UE includes communicating with the UE via a first radio access technology ("RAT"), and wherein the target RAN is associated with a second RAT.

13. The non-transitory computer-readable medium of claim 8, wherein instructing the UE to connect to the target RAN includes outputting a redirection instruction to the UE.

14. The non-transitory computer-readable medium of claim 8, wherein the UE determines that the voice call has ended based on receiving an indication from a telephony application server associated with the voice call.

15. A method implemented by a device, the method comprising:
communicating with a User Equipment ("UE") via a wireless communication interface;
receiving an indication that the UE is connected to the device for a voice call;
receiving a request from the UE to disconnect the UE from the device, wherein the UE outputs the request based on determining that the voice call has ended;
identifying a target radio access network ("RAN") for the UE based on the request to disconnect the UE;
receiving downlink data for the UE after receiving the request from the UE;
storing the received downlink data for the UE without sending the downlink data to the UE, based on receiving the request from the UE and further based on receiving the indication that the UE is connected to the device for the voice call;
instructing the UE to connect to the target RAN;
receiving an indication that the UE has connected to the target RAN; and
outputting the stored downlink data to the target RAN based on receiving the indication that the UE has connected to the target RAN.

16. The method of claim 15, wherein the request from the UE includes one or more Radio Resource Control ("RRC") messages.

17. The method of claim 15, wherein the request from the UE includes an identifier associated with the target RAN, wherein identifying the target RAN is based on the identifier included in the request.

18. The method of claim 15, the method further comprising:
receiving, from the UE, one or more measurement reports associated with a plurality of candidate RANs, and wherein identifying the target RAN includes selecting a particular one of the plurality of candidate RANs based on the one or more measurement reports.

19. The method of claim 15, wherein instructing the UE to connect to the target RAN includes outputting a redirection instruction to the UE.

20. The method of claim 15, wherein the UE determines that the voice call has ended based on receiving an indication from a telephony application server associated with the voice call.

* * * * *